US012588782B2

(12) United States Patent
Fiorani

(10) Patent No.: US 12,588,782 B2
(45) Date of Patent: Mar. 31, 2026

(54) COFFEE GRINDER WITH AUTOMATIC DOSE CONTROL SYSTEM

(71) Applicant: CONTI VALERIO-S.R.L., Sesto Fiorentino (IT)

(72) Inventor: Maurizio Fiorani, Milan (IT)

( * ) Notice: Subject to any disclaimer, the term of this patent is extended or adjusted under 35 U.S.C. 154(b) by 337 days.

(21) Appl. No.: 18/458,434

(22) Filed: Aug. 30, 2023

(65) Prior Publication Data

US 2024/0065481 A1    Feb. 29, 2024

(30) Foreign Application Priority Data

Aug. 31, 2022    (IT) ........................ 102022000017913

(51) Int. Cl.
| | |
|---|---|
| *A47J 42/44* | (2006.01) |
| *A23F 5/08* | (2006.01) |
| *A47J 42/38* | (2006.01) |
| *A47J 42/40* | (2006.01) |
| *A47J 42/46* | (2006.01) |
| *A47J 42/50* | (2006.01) |
| *G05B 11/42* | (2006.01) |

(52) U.S. Cl.
CPC ................. *A47J 42/44* (2013.01); *A23F 5/08* (2013.01); *A47J 42/40* (2013.01); *A47J 42/46* (2013.01)

(58) Field of Classification Search
CPC .. A47J 42/44; A47J 42/40; A47J 42/46; A47J 42/38; A47J 42/50; A23F 5/08; G05B 11/42
See application file for complete search history.

(56) References Cited

U.S. PATENT DOCUMENTS

| | | | | |
|---|---|---|---|---|
| 2016/0143481 A1* | 5/2016 | Merelli | .................... | A47J 42/44 |
| | | | | 241/34 |
| 2024/0285117 A1* | 8/2024 | Rodrigues | ................ | A47J 42/40 |
| 2024/0315487 A1* | 9/2024 | Colizza | .................... | A47J 42/44 |

FOREIGN PATENT DOCUMENTS

EP        3023041 A1    5/2016

* cited by examiner

*Primary Examiner* — Mohammed S. Alawadi

(57) ABSTRACT

Disclosed is a coffee grinder having an automatic coffee dose control system that provides for comparing a difference between an ideal weight set by a user and an actual weight measured by a load cell with an error; if the difference between the ideal weight and the actual weight is greater than the error, an extra-dose of coffee powder is dispensed.

7 Claims, 4 Drawing Sheets

COFFEE GRINDER WITH AUTOMATIC DOSE CONTROL SYSTEM

FIELD OF THE INVENTION

The present invention relates to a coffee grinder with an automatic dose control system.

BACKGROUND OF THE INVENTION

Coffee grinders provided with a support to support a filter holder suitable for being filled with a dose of ground coffee are commercially known. Such coffee grinders have a load cell connected to the support to weigh the ground coffee dispensed into the filter holder and to stop dispensing when the coffee weight reaches a preset dose.

EP3023041A1 in the name of Simonelli Group S.P.A. describes such a type of coffee grinder with a load cell.

When the grinder of the coffee grinder is stopped, due to inertia the grinder continues to rotate and thus a small amount of ground coffee continues to flow out of the dispensing duct. For such a reason, the grinder group must be stopped in advance to avoid exceeding the required amount of coffee. Such an advance is known as "time-of-flight".

To comply with the time-of-flight, the load cell can be calibrated to a slightly lower weight than the weight of one coffee dose, i.e. a tare weight equal to the weight of coffee dispensed during the time-of-flight is subtracted from the weight of a dose.

However, the time-of-flight is not constant for all types of coffee, but depends on the grain size of the ground coffee. The finer the grain size, the greater the time-of-flight to be considered will be. In addition, the time-of-flight also depends on the mechanical structure of the grinder and on the electronics driving the grinder. Therefore, the coffee grinders of the prior art generally have errors and inaccuracies in the dosing system, which are mainly due to an incorrect calculation of the time-of-flight.

BRIEF SUMMARY OF THE INVENTION

The purpose of the present invention is to eliminate the drawbacks of the prior art by providing a coffee grinder with an automatic dose control system that is accurate and reliable.

Another purpose is to provide such a coffee grinder that is capable of automatically controlling the dispensing of a dose of ground coffee, regardless of both the grain size of the coffee and the mechanics and electronics of the coffee grinder.

Still another purpose of the present invention is to provide such a coffee grinder that is easy to manufacture and simple to use.

These purposes are achieved in accordance with the invention with the features of the appended independent claims.

Advantageous achievements of the invention appear from the dependent claims.

BRIEF DESCRIPTION OF THE SEVERAL VIEWS OF THE DRAWINGS

Further features of the invention will appear clearer from the following detailed description, referring to a purely illustrative and therefore non-limiting embodiment, illustrated in the appended drawings, wherein.

DETAILED DESCRIPTION OF THE INVENTION

With the aid of the Figures, the coffee grinder according to the invention is described, it being comprehensively indicated by reference number 100.

Figure 1:
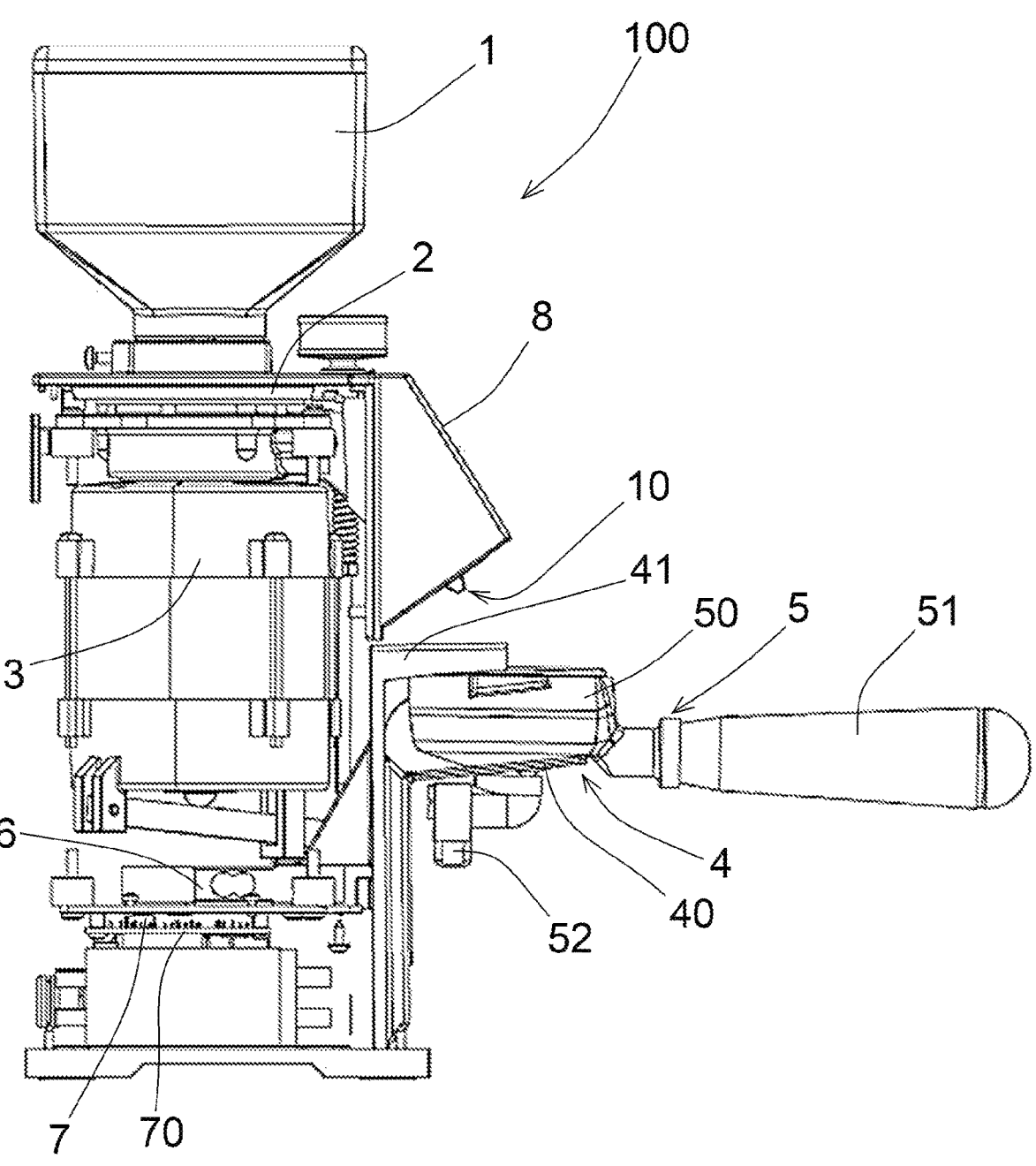
FIG. 1 is a diagrammatic side view of a coffee grinder according to the invention.

Referring to FIG. 1, the coffee grinder (100) comprises:
a hopper (1) for loading the coffee beans,
a grinder (2) to grind the coffee beans into coffee powder,
an electric motor (3) to drive the grinder (2),
a dispensing unit (10) to dispense the coffee powder,
a support (4) to support a filter holder (5) under the dispensing unit (10),
a load cell (6) connected to the support (4) to weigh the coffee powder inside the filter holder (5),
a control unit (7) electrically connected to the load cell (6), and
a user interface (8) connected to the control unit (7).

The filter holder (5) is a typical filter holder for a coffee machine. The filter holder (5) comprises:
a container (50) that is basically cylindrical,
a handle (51) that protrudes radially from the container, and
a dispensing nozzle (52) that protrudes inferiorly from the container to dispense the liquid coffee.

The support (4) comprises:
a fork (40) suitable for supporting the container (50) of the filter holder, and
a bracket (41) that connects the fork (40) to the load cell (6).

The load cell (6) is connected to a printed circuit board (PCB) (70) on which the control unit (7) is mounted.

Figure 2:
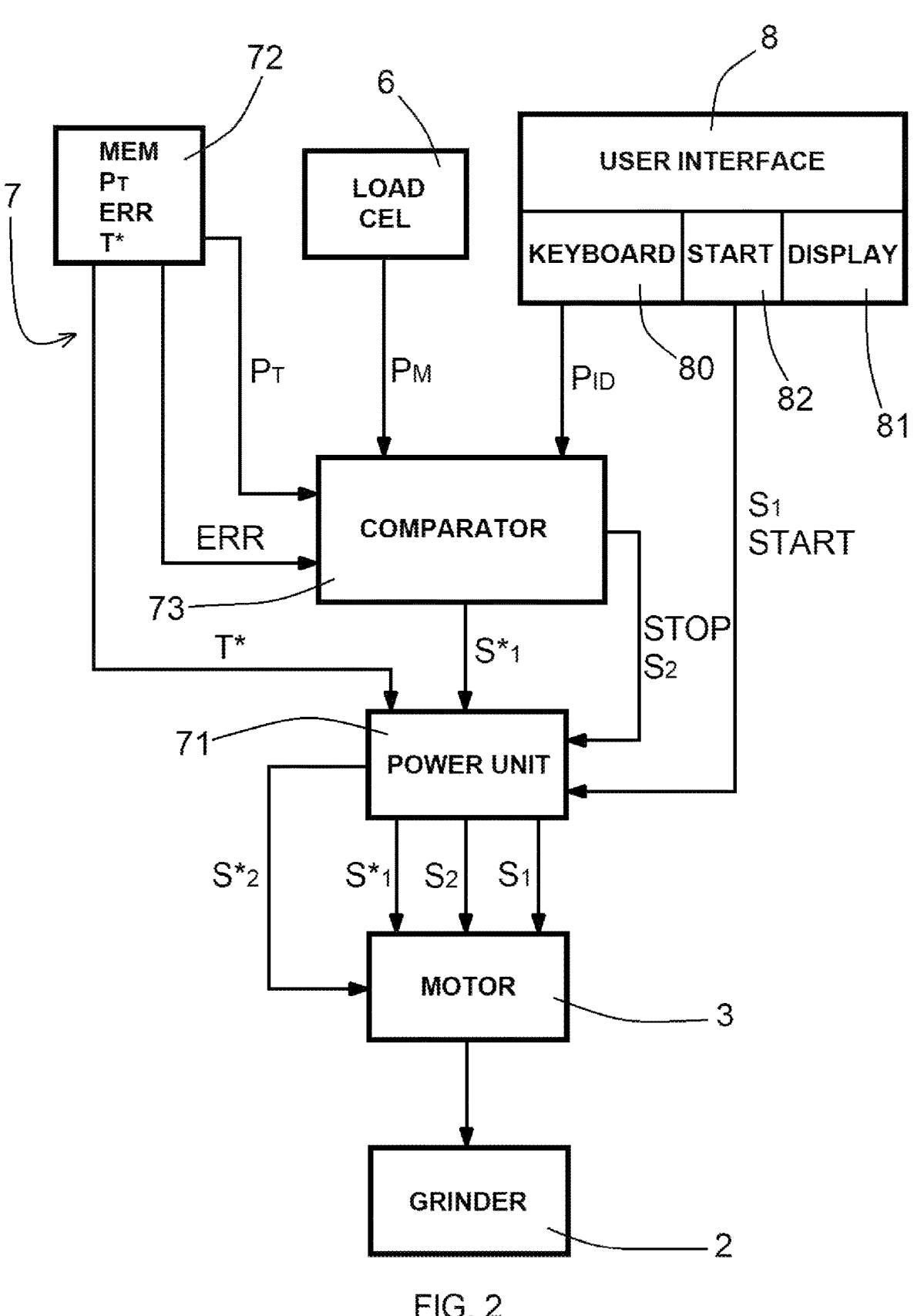
FIG. 2 is a block diagram of the coffee grinder of FIG. 1.

Referring to FIG. 2, the control unit (7) comprises:
a power unit (71) to drive the electric motor (3),
a memory (72) in which some operating parameters of the coffee grinder are stored, and
a comparator (73) to perform comparisons between parameters and variables.

The user interface (8) comprises:
a keyboard (80) used by the user to enter an ideal weight (PID) of a coffee dose,
a display (81) to display the ideal weight entered by the user,
a start button (82) to start the grinding cycle.

The following parameters are stored in the memory (72):
a tare weight ($P_T$) that considers the time-of-flight of the grinder,
an error (ERR) that considers a permissible error with respect to the ideal weight ($P_{ID}$) entered by the user, and
an extra-dose time (T*) that considers an operating time of the grinder (2) for the grinder to make an extra run to dispense an extra-dose of ground coffee.

The time-of-flight is the time in which the grinder (2) continues to rotate by inertia after the motor (3) is turned off. The tare weight ($P_T$) is a weight of the coffee that is ground during the time-of-flight, increased by a correction factor so as to consider an advance over the time-of-flight. The correction factor ensures that at the end of grinding operation, the actual weight of the coffee dose in the filter holder does not exceed the desired ideal weight. The tare weight ($P_M$) is set by the machine manufacturer based on experimental tests done with coffee grinders in the case of grinding the beans for an espresso coffee.

The error (ERR) is calculated based on experimental tests done on the quality of the liquid coffee obtained with doses that are different from the ideal dose. It was found that if the error is kept, for example, in the range of about 0.05-0.3 grams, preferably 0.2 grams, the quality of the liquid coffee is still acceptable.

The extra-dose time (T*) is calculated for the grinder (2) to make an extra run, dispensing a minimum amount of coffee powder (extra-dose), i.e., an amount of coffee powder less than the error (ERR). By way of example, the time-dose (T*) is calculated to dispense 0.1 gram of coffee powder.

Figure 3:
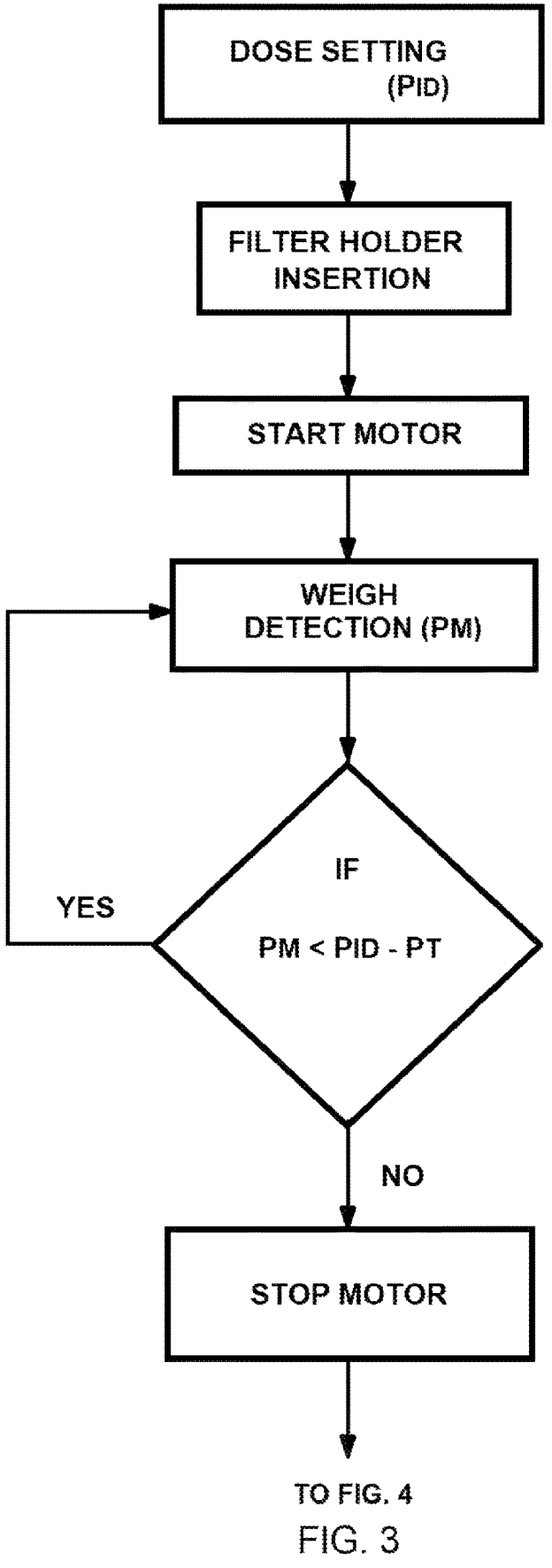
FIG. 3 is a flowchart illustrating a first operational step of the coffee grinder of FIG. 1.
Figure 4:
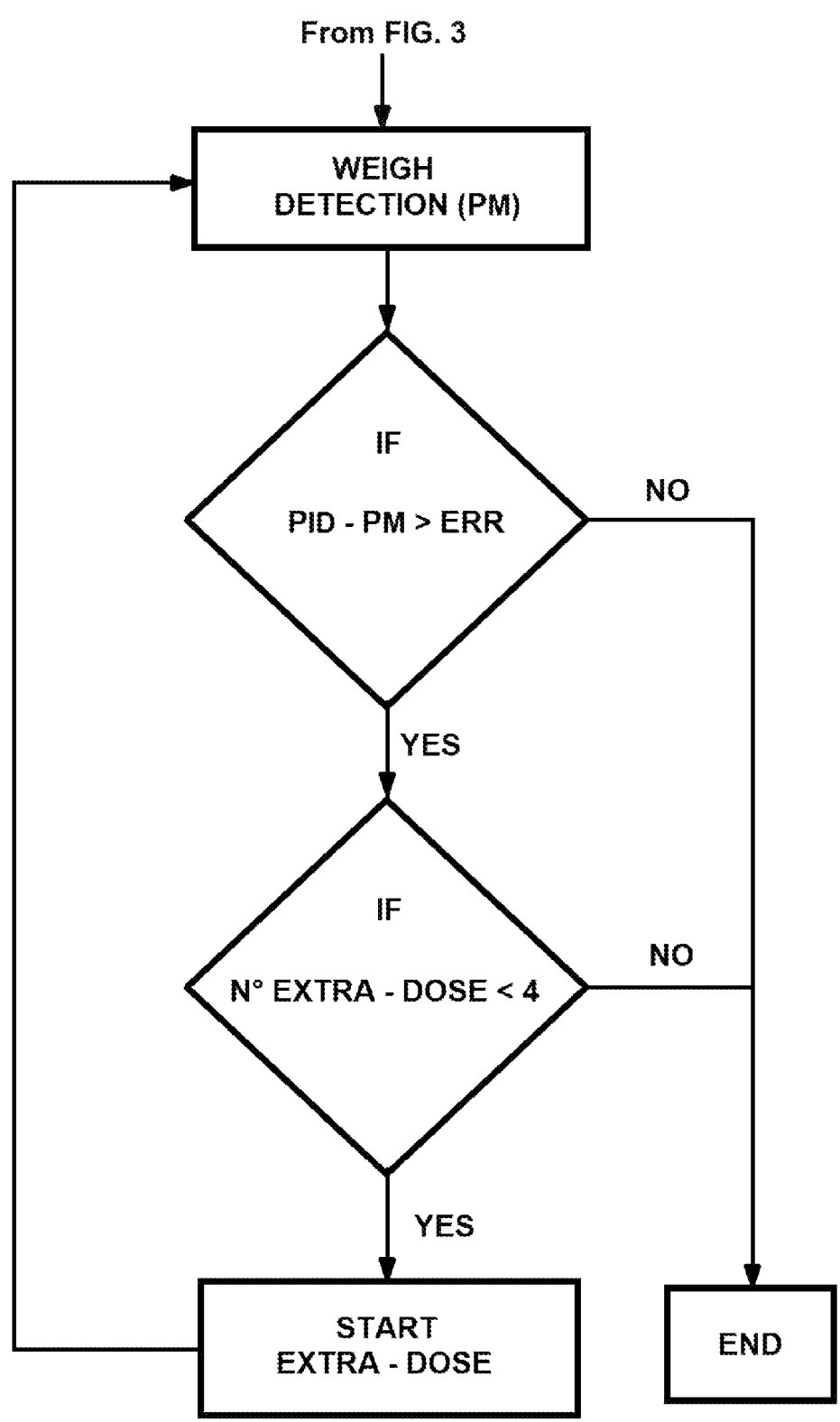
FIG. 4 is a flowchart illustrating a second operational step of the coffee grinder of FIG. 1.

Now with reference to FIGS. 2, 3 and 4, the operation of the coffee grinder (100) is described.

Referring to FIGS. 2 and 3, the user enters the ideal weight ($P_{ID}$) of the coffee powder dose to be obtained using the keyboard (80) of the user interface, and reads the ideal weight on the display (81).

Then the user inserts the filter holder (5) into the support (4) and presses the start button (82), which generates a start signal (S1) to the power unit (71) that drives the motor (3) that moves the grinder (2). The grinder grinds the coffee beans into coffee powder that is dispensed from the dispensing unit (10) and falls into the container (50) of the filter holder.

When the coffee powder is dispensed from the dispensing unit (10) and falls into the filter holder (5), the load cell (6) continuously detects the actual weight ($P_M$) of the coffee powder in the filter holder.

The comparator (73) is configured to compare the real weight ($P_M$) detected by the load cell with the ideal weight ($P_{ID}$) set by the user minus the tare weight ($P_T$) which is a machine parameter.

When the actual weight ($P_M$) is equal to the ideal weight ($P_{ID}$) minus the tare weight ($P_T$), then the comparator (73) sends a stop signal (S2) to the power unit (71), which stops the motor (3) of the grinder (2). So the grinder (2) is stopped early, when still the weight of the coffee in the filter holder has not reached the ideal weight ($P_{ID}$). During the time-of-flight, the grinder continues to rotate by inertia and more coffee powder is dispensed and falls into the filter holder (5).

Obviously, it cannot be predicted whether at the end of the time-of-flight the weight of coffee in the filter holder is exactly equal to the ideal weight ($P_{ID}$). However, since a correction factor has been added in the tare weight ($P_T$), presumably the amount of coffee in the filter holder should have a slightly lower weight than the ideal weight ($P_{ID}$) and it might be necessary to add one or more extra-doses to approximate the ideal weight.

With reference to FIGS. 2 and 4, after a waiting time of 1 second, for instance, after the engine has stopped, the load cell (6) weighs the coffee in the filter holder again, i.e., it weighs the actual weight ($P_M$).

At this point, the comparator (73) is configured to compare the difference between the ideal weight ($P_{ID}$) and the actual weight ($P_M$) with the error (ERR).

If the difference between the ideal weight ($P_{ID}$) and the actual weight ($P_M$) is less than or equal to the error (ERR):

$$P_{ID}-P_M < ERR$$

in such a case, it means that the tare weight ($P_T$) was set correctly for that type of grinding and therefore no extra-dose is needed to correct the amount of coffee powder dispensed. Therefore, the dispensing cycle of coffee powder is ended.

Instead, if the difference between the ideal weight ($P_{ID}$) and the actual weight ($P_M$) is greater than the error (ERR):

$$P_{ID}-P_M > ERR,$$

in such a case it means that the tare weight ($P_T$) is not set correctly for that type of grinding and therefore one or more extra-doses of ground coffee is necessary to correct the amount of coffee powder dispensed so far. Therefore, the comparator (73) sends an extra-dose start signal (S1*) to the power unit (71) and the power unit (71) drives the motor (3) of the grinder for an extra-dose time (T*) to dispense an extra-dose. Otherwise said, after the extra-dose time (T*), the power unit (71) sends an extra-dose stop signal (S2*) and the motor (3) stops.

At this point, the filter holder (5) is weighed again to detect whether, after the addition of the first extra-dose, the difference between the ideal weight ($P_{ID}$) and the actual weight ($P_M$) is less than or equal to the error (ERR). In case the difference between the ideal weight ($P_{ID}$) and the actual weight ($P_M$) is greater than the error (ERR), a second extra-dose is dispensed.

Such an extra-dose dispensing cycle is performed for a limited number of times, such as four times.

Equivalent variations and modifications may be made to the present embodiment of the invention, within the scope of an expert of the field, but still within the scope of the invention as expressed by the appended claims.

I claim:

1. A coffee grinder comprising:

a hopper adapted to load coffee beans therein;

a grinder communicating with said hopper so as to grind the coffee beans into coffee powder therein;

an electric motor drivingly connected to said grinder so as to operate said grinder;

a dispenser unit connected to said grinder so as to dispense the coffee powder thereinto;

a support that supports a filter holder under said dispenser unit;

a load cell connected to said support, said load cell adapted to weight the coffee powder within the filter holder so as to obtain an actual weight of the coffee powder in the filter holder;

a control unit electrically connected to said load cell;

an interface connected to said control unit, said interface adapted to allow a user to operate said control unit, said control comprising:

a power unit connected to said electric motor so as to supply power to said electric motor;

a memory that stores operating parameters of the coffee grinder; and a comparator for performing a comparison between the operating parameters and variables thereof, wherein said interface comprises:

a keyboard connected to said control unit said so as to allow the user to enter a weight of a coffee dose;

a display connected to said control unit and adapted to display the weight of the coffee dose;

a start button connected to said grinder so as to allow the user to start a grinding cycle of said grinder, wherein the operating parameters are a tare weight based on a time-of-flight of said grinder and an error relative to the weight of the coffee dose and an extra-dose time of said grinder so as to drive said grinder for an extra dose of the ground coffee, said comparator being configured to compare the actual weight detected by said load cell with the weight of the coffee dose entered by said keyboard minus the tare weight after said start button is pressed, wherein when the actual weight is equal to the weight of the coffee dose entered by said keyboard minus the tare weight then said comparator sends a stop signal to said power unit so as to stop said motor, wherein said comparator compares a difference between the weight of the coffee dose entered by said keyboard and the actual weight with the error after a waiting time from the stop signal such that if a difference between the weight entered by the keyboard and the actual weight is less than or equal to the error then the dispensing of the coffee powder ends, wherein if a difference between the weight entered by said keyboard and the actual weight is greater than the error then said comparator sends an extra-dose start signal to said power unit such that said power unit drives said motor of said grinder so as to set an extra-dose time for dispensing the extra-dose and in which said power unit sends an extra-dose stop signal to stop said motor after the extra-dose time, wherein said load cell weighs the filter holder and said comparator evaluates whether the difference between the weight entered by the keyboard and the actual weight is less than or equal to the error after a waiting time from the extra-dose stop signal or when a difference between the weight entered by the keyboard and the actual weight is greater than the error then a second extra dose is dispensed by said dispenser.

2. The coffee grinder of claim 1, wherein the error is between 0.05 grams and 0.3 grams.

3. The coffee grinder of claim 1, wherein the extra-dose time is set so as to dispense the coffee powder in amount that is less than the error.

4. A method for dispensing a dose of ground coffee with a coffee grinder, the method comprising:

setting an ideal weight of the dose of ground coffee;

inserting a filter holder into a support of the coffee grinder;

starting a motor of the grinder;

detecting an actual weight of the coffee powder in the filter holder;

comparing the actual weight with the ideal weight minus a tare weight;

stopping the motor of the grinder when the actual weight equals the ideal weight minus the tare weight;

waiting for a waiting time after the step of stopping the motor;

determining an error with respect to the ideal weight;

comparing a difference between the ideal weight and the actual weight with the error such that if a difference between the ideal weight and the actual weight is less than or equal to the error then the dispensing of the dose of the ground coffee ends;

dispensing an extra dose of the coffee powder in the filter holder for an extra-dose period of time if the difference between the ideal weight and the actual weight is greater than the error;

waiting for a time period after the dispensing of the extra dose;

returning to the step of detecting the actual weight of the coffee powder in the holder.

5. The method of claim 4, wherein the error is between 0.15 grams to 0.3 grams.

6. The method of claim 5, wherein the error is set at 0.2 grams.

7. The method of claim 4, wherein the grinder dispenses the coffee powder in an amount less than the error based on the extra dose period of time.

* * * * *